No. 630,887. Patented Aug. 15, 1899.
R. C. HINES.
EYEGLASSES.
(Application filed May 23, 1899.)

(No Model.)

Witnesses:
M. A. Leese
H. B. Maddey

Inventor:
Rudolph C. Hines

UNITED STATES PATENT OFFICE.

RUDOLPH C. HINES, OF WASHINGTON, DISTRICT OF COLUMBIA.

EYEGLASSES.

SPECIFICATION forming part of Letters Patent No. 630,887, dated August 15, 1899.

Application filed May 23, 1899. Serial No. 717,931. (No model.)

*To all whom it may concern:*

Be it known that I, RUDOLPH C. HINES, a citizen of the United States, residing at Washington, in the District of Columbia, have invented an Improvement in Eyeglasses, of which the following is a specification.

The object of this invention is to provide eyeglasses with means whereby the user or wearer may with one hand easily and conveniently adjust the nose pieces or pads in placing or positioning the eyeglasses upon the nose.

The invention consists in eyeglasses of ordinary or common construction provided with an adjusting band or spring comprising a continuous strip of suitable material secured at one end to one of the lenses and extending over the bow to the other lens and having a sliding connection with the bow and said last-mentioned lens and terminating in a finger-piece in proximity to the thumb-piece of the eyeglasses, whereby the nose-pieces may be adjusted, substantially as I will proceed now more particularly to set forth and finally claim.

Figure 1:
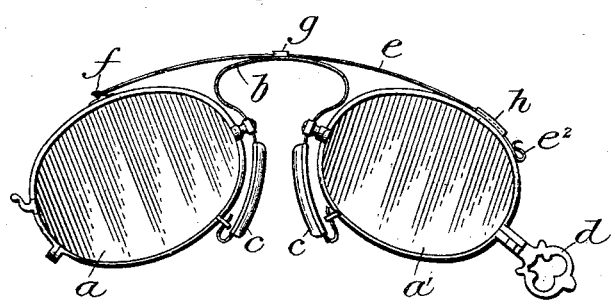
Figure 2:
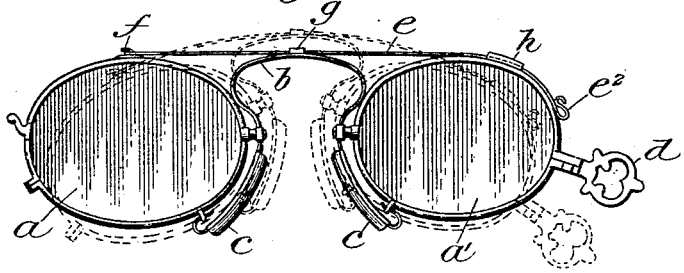
Figure 3:

In the accompanying drawings, illustrating my invention, in the several figures of which like parts are similarly designated, Figure 1 is a side view of a pair of ordinary eyeglasses with my invention applied in normal position. Fig. 2 is a similar view showing the bow and nose-pieces distended or adjusted, the normal position of the eyeglasses being shown in dotted lines; and Fig. 3 is a plan view, and Fig. 4 a side view, of the flexible band or spring detached.

As shown in the drawings, the lenses $a$ $a'$, the bow $b$, the nose-pieces $c$ $c$, and thumb-piece $d$ are of usual or ordinary construction.

In carrying out my invention I provide a continuous thin flat strip or band $e$ of steel or other suitable rigid material, provided at one end with a perforation or eye $e'$ and at its other end with a finger-piece $e^2$, and adapted to be attached to the eyeglasses in a manner hereinafter described.

The lens $a$ of the eyeglasses is provided with a hook $f$, the bow $b$ is provided with a guide $g$, and the lens $a'$ is provided with a guide $h$.

In applying the adjusting-band $e$ to the eyeglasses the perforated end $e'$ thereof is first passed through the guide $h$ on the lens $a'$, then through the guide $g$ on the bow $b$, and the perforated end is then secured over the hook $f$ on the lens $a$, the finger-piece $e^2$ of the band or spring $e$ by this arrangement being located in proximity to the thumb-piece of the eyeglasses for a purpose presently appearing. By this construction and arrangement it will be observed that the band $e$ becomes rigidly secured to the lens $a$—that is to say, rigidly secured against longitudinal pull on the band by the finger-piece $e^2$—and said band also has a sliding connection with the bow $b$ and the lens $a'$ of the eyeglasses, thereby to permit such longitudinal pull.

Figure 4:

In the preferred form of my invention the band $e$ is constructed of a continuous piece or strip of spring-steel, and it is made of a curvature substantially as indicated in Fig. 4, so that when it is applied to the eyeglasses it will be slightly distended or put under tension and assume the position or curvature indicated in Fig. 1, and thereby enhance the springiness of the eyeglasses by adding its tension to the tension of the bow. However, it is obvious that the adjusting device or band $e$ may be constructed of other than spring material—that is to say, it may be constructed of a material of sufficient rigidity to sustain it in position and of sufficient flexibility to permit of the manipulation or adjustment of the eyeglasses.

The operation of my invention is as follows: The user or wearer of the eyeglasses simply takes hold of the thumb-piece $d$ between the thumb and a finger and by an intermediate finger engages the finger-piece $e^2$ of the band or spring $e$ and exerts pull thereon, whereby the band or spring, being rigidly connected to the lens $a$, causes said lens to move, and thereby effect an adjustment of its nose-piece with relation to the nose-piece of the lens $a'$, as clearly shown in Fig. 2, and the eyeglasses thus easily adjusted and positioned on the nose of the wearer and the spring or band released and by the operation of one hand.

As shown in the drawings and in the preferred form of my invention, the band or spring $e$ is made detachable for purposes of renewal in case of breakage by simply disengaging the perforated end thereof from the hook on the lens $a$ and sliding or drawing the band or spring through the guides on the bow $b$ and lens $a'$. However, it is within my invention to otherwise secure the band or spring to the eyeglasses—that is to say, it may be permanently secured thereto. Furthermore, I have herein shown my invention as applied to eyeglasses having rimmed or framed lenses; but the invention is equally applicable to rimless eyeglasses, suitable provisions being made for the attachment of the hook $f$ and guide $h$ to the rimless lenses, and, furthermore, my invention can be applied to eyeglasses already in use.

What I claim is—

1. The combination with eyeglasses of ordinary construction, of an adjusting-band constructed of a continuous strip of material secured at one end to one of the lenses and extending over the bow to the other lens, and having a sliding connection with said bow and last-mentioned lens, and terminating in a finger-piece, substantially as and for the purpose described.

2. Eyeglasses of ordinary construction, provided with an adjusting-band constructed of a continuous strip of material secured at one end to one lens and extending over the bow to the other lens and having a sliding connection with said bow and last-mentioned lens, and terminating in a finger-piece in proximity to the thumb-piece of the eyeglasses, substantially as described.

3. Eyeglasses of ordinary construction, provided with an adjusting-band constructed of a continuous strip of spring material secured at one end to one lens and extending over the bow to the other lens and having a sliding connection with said bow and last-mentioned lens and terminating in a finger-piece in proximity to the thumb-piece of the eyeglasses, said spring adjusting-band exerting tension on said lenses, substantially as described.

4. In eyeglasses, the lens $a$ provided with a hook $f$, the bow $b$ provided with a guide $g$, and the lens $a'$ provided with a guide $h$, combined with an adjusting-band $e$ adapted to engage said hook and guides whereby a rigid and sliding connection between said lenses is secured, and a finger-piece on said adjusting-band to effect the adjustment of the lenses and their attached nose-pieces, substantially as described.

5. In eyeglasses, the lens $a$ provided with a hook $f$, the bow $b$, provided with a guide $g$, and the lens $a'$ provided with a guide $h$, combined with a detachable adjusting-band, $e$, adapted to engage said hook and guides, whereby a rigid and sliding connection between said lenses is secured, and a finger-piece on said adjusting-band to effect the adjustment of the lenses and their attached nose-pieces, substantially as described.

RUDOLPH C. HINES.

Witnesses:
M. A. LEESE,
H. B. WADDEY.